(12) United States Patent
Moskalev et al.

(10) Patent No.: US 7,457,977 B2
(45) Date of Patent: Nov. 25, 2008

(54) SYNCHRONIZATION OF FIRMWARE SIGNAL UPDATES TO REGULAR CLOCK FREQUENCY

(75) Inventors: Anatoly Moskalev, Bethlehem, PA (US); Parakalan Venkataraghaven, Allentown, PA (US)

(73) Assignee: Agere Systems Inc., Allentown, PA (US)

( * ) Notice: Subject to any disclaimer, the term of this patent is extended or adjusted under 35 U.S.C. 154(b) by 560 days.

(21) Appl. No.: 11/154,438

(22) Filed: Jun. 16, 2005

(65) Prior Publication Data

US 2006/0288247 A1 Dec. 21, 2006

(51) Int. Cl.
*G06F 1/22* (2006.01)
(52) U.S. Cl. ............... 713/400; 710/60; 713/401; 713/500
(58) Field of Classification Search ............... 713/400, 713/401, 500; 710/60
See application file for complete search history.

(56) References Cited

U.S. PATENT DOCUMENTS

| 4,161,778 | A | * | 7/1979 | Getson et al. ............... 711/117 |
| 5,437,021 | A | * | 7/1995 | David et al. ............... 713/502 |
| 6,839,654 | B2 | * | 1/2005 | Rollig et al. ............... 702/178 |

* cited by examiner

*Primary Examiner*—Thomas Lee
*Assistant Examiner*—Albert Wang

(57) ABSTRACT

The present invention provides a method and apparatus for improving the synchronization of timing signals in a system where firmware is being employed. In particular, the present invention enables the firmware to generate signals with a timing that is required by a hardware protocol. The resulting system is thus able to permit reasonable firmware changes without adversely effecting signal timing.

12 Claims, 2 Drawing Sheets

SYNCHRONIZATION OF FIRMWARE SIGNAL UPDATES TO REGULAR CLOCK FREQUENCY

FIELD OF THE INVENTION

The present invention relates to data transfer control systems that employ firmware functionality, and more particularly to an effective manner in which to utilize hardware clock signals in conjunction with the system firmware to provide proper synchronization of read and write operations.

BACKGROUND OF THE INVENTION

Various applications exist in which it is advantageous to have software/firmware perform various timing functions. One such application is found in controllers for ink jet printers. Use of firmware timing provides flexibility in the control of signal timing operations to enable a particular controller design to be utilized by a variety of printers. As these printers employ various types of ink cartridges with different numbers and types of nozzles, each potentially requiring different timing of firing pulses, one can readily appreciate the advantage of having a single hardware device whose timing functions can be modified by employing firmware timing.

Use of firmware to generate accurate timing signals needs to address an inherent problem associated with processor execution flow. In the example where firmware is used to compute and update a digital signal coming out of a processor core, the actual time instants when the signal update instructions are executed are determined by the processor execution flow. As a result, changes in the processor execution flow cause variations in the generated timing signals. Consequently, this signal update timing is generally far from the required timing. Moreover, it is sensitive to firmware changes. A problem exists as to how to use firmware to generate signals with a timing that is required by a hardware protocol and to make the signal timing insensitive to reasonable firmware code changes.

One prior art technique for solving this problem relates to using a machine instruction whose execution time has a fixed number of machine cycles. The execution time of such an instruction is absolutely predictable and independent of data and execution context. By way of example, let such an instruction be completed in one clock pulse. Further by way of example, let this instruction be called "NO-OPERATION", taking a single clock cycle and resulting in no detectable change of firmware execution results. It should be noted that most processors have a special instruction with such properties.

This "NO-OPERATION" instruction can be used to adjust timing for firmware computing and updating input and output signaling. That is, proper insertion of "NO-OPERATION" instructions in different lines of the firmware code can be used to delay signal changing instruction executions in a manner that performs the required timing. However, this procedure is very labor intensive and requires complete realignment of "NO-OPERATION" insertions in the case of even minor code changes.

SUMMARY OF THE INVENTION

The present invention provides a method and apparatus for performing the synchronization of timing signals in a system where firmware is being employed. In particular, the present invention enables the firmware to generate signals with a timing that is determined by a hardware protocol. The resulting system is thus able to permit reasonable firmware changes without adversely affecting signal timing.

BRIEF DESCRIPTION OF THE DRAWINGS

Various embodiments of the present invention will now be described in detail in conjunction with the annexed drawings, in which.

DETAILED DESCRIPTION

The present invention provides a method and apparatus for improving the synchronization of timing signals in a system where firmware is being employed. In particular, the present invention enables the firmware to generate signals with a timing that is determined by a hardware protocol.

Figure 1A:
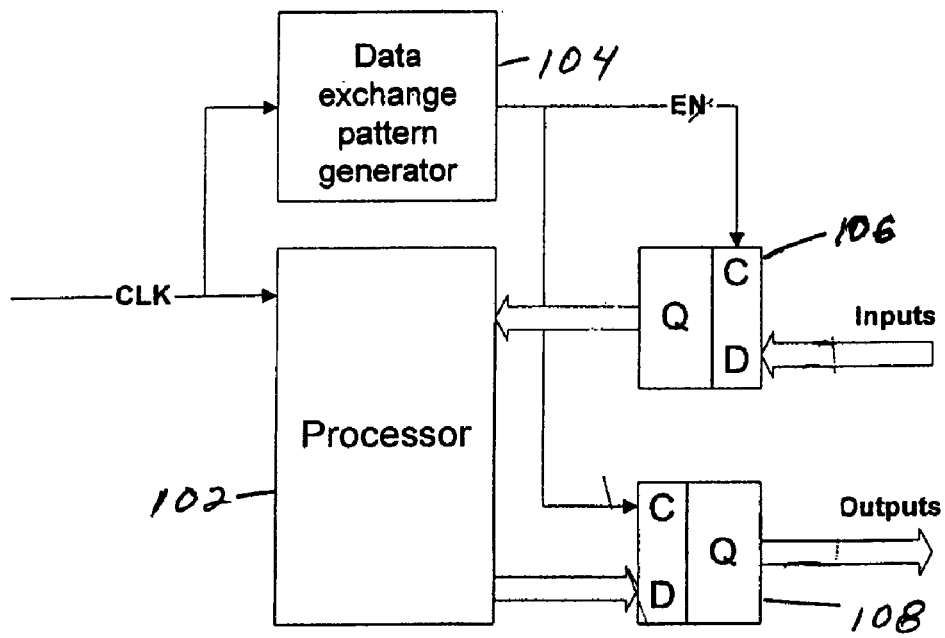
FIG. 1A is a block diagram of an embodiment of the present invention.
Figure 1B:
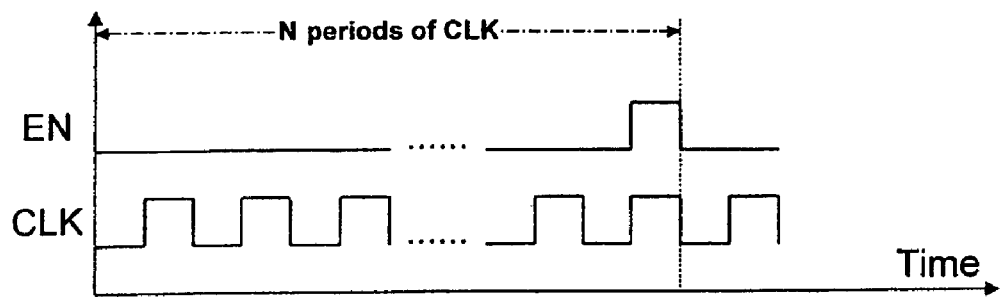
FIG. 1B is a timing diagram corresponding to the signaling present in the embodiment depicted in FIG. 1A.

In the embodiment of the invention depicted in FIG. 1A, a clock signal CLK used by processor 102 is also supplied to a data exchange pattern generator block 104. This block 104 generates an enable signal, EN, which is a signal having a pulse every N-th period of CLK signal (N being a positive integer) as shown on the timing diagram depicted in FIG. 1B. Processor 102 reads input signals or changes output signals at arbitrary moments between these EN pulses. The embodiment of the invention depicted in FIG. 1A employs flip-flops 106 and 108 in the input/output functions of the system. These flip-flops act as input and output data registers, respectively. They provide a timing control mechanism which controls the data present when the processor 102 performs read and write operations.

In particular, the flip-flops 106 and 108, connected to processor input and output signals, change values only at the active edge (i.e., the rising or the falling edge) of EN pulses. Thus, through flip-flop 106 the processor 102 reads input signal levels actually sampled at the EN pulse edge just before reading. Similarly, output signal updates from the processor 102 actually translate to the output of flip-flop 108 at the next EN pulse edge.

As is well known in the art, typically the processor senses the active edge of EN pulses, and runs firmware code upon it being activated by such edge. Consequently with this embodiment of the invention, as this firmware code performs read and write operations triggered by the EN pulse, it will do so utilizing the properly timed data present in the appropriate flip-flop 106, 108. That is, after such activation, the system will read input signals, make proper computations and update output signals essentially using precisely timed input signal samples and output signal updates.

In this embodiment of the invention, the actual moments of signal reads and output updates do not matter as long as they fit between adjacent active edges of EN pulses. Accordingly, this embodiment allows well-known firmware programming style—with overall processing time being limited by the EN pulses period. Moreover, changes could be made to firmware without requiring any detailed adjustment of actual time of signal reads and writes. This embodiment of the invention also allows for the fact that the described processing computation between active edges of EN pulses could be variable. That is, computations could be conditional and could take different execution times based on what data is being processed. As long as the maximum possible computation time is smaller than the EN pulse period, the timing of signals is unchanged. Further, were it necessary, any adjustments for timing of input/output signals can be accomplished readily by modifying the number N of clock periods which trigger the EN pulses.

In the embodiment depicted in FIG. 1A, a single flip-flop 106 is depicted performing the input function of the system. The invention is not so limited as alternative embodiments comprise a plurality of such input flip-flops which are thus capable of transferring multiple bits in parallel. Similarly, alternative embodiments employ multiple output flip-flops instead of the single flip-flop 108 depicted in FIG. 1A.

Figure 2A:
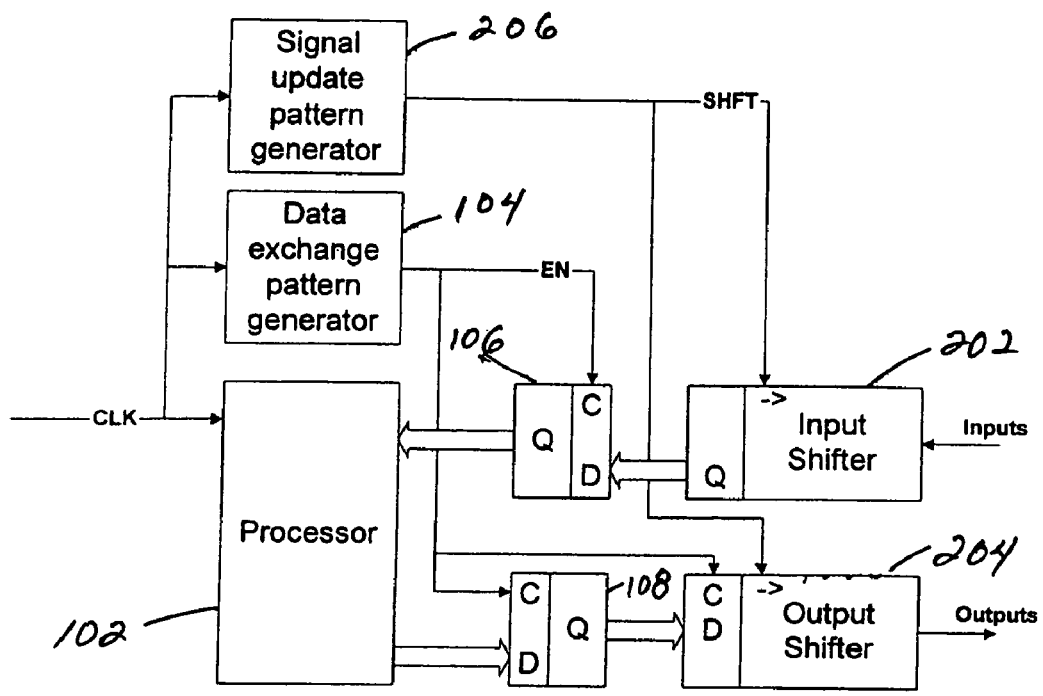
FIG. 2A is a block diagram of a further embodiment of the present invention; and, FIG. 2B is a timing diagram corresponding to the signaling present in the embodiment depicted in FIG. 2A.

FIG. 2A depicts a further embodiment of the invention in which shift registers are employed to increase the input/output signal frequency relative to the processor clock frequency. As illustrated in FIG. 2A, the clock signal CLK supplied to processor 102 is also supplied to the data exchange pattern generator block 104 as in the above described embodiment. In addition, the CLK signal is supplied to a signal update pattern generator block 206.

Figure 2B:
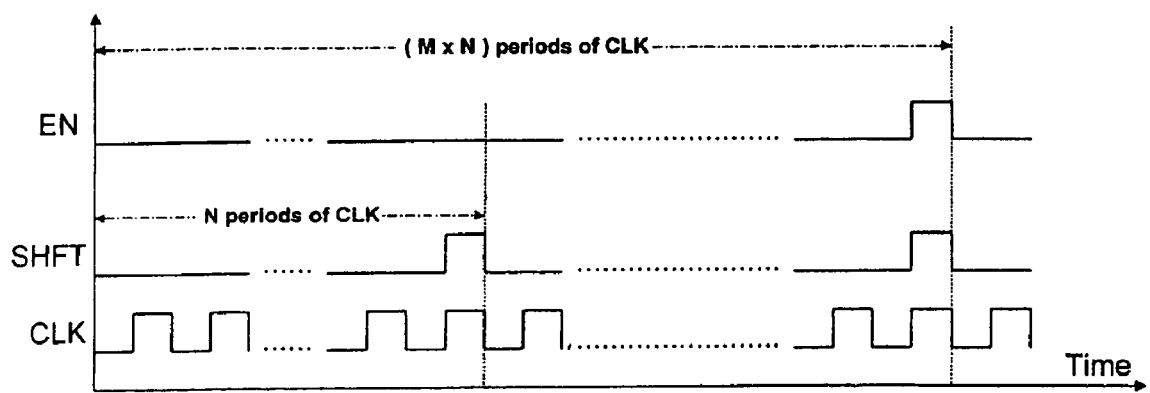

As illustrated in the timing diagram of FIG. 2B, these blocks generate a SHFT output signal (Block 206), which has a pulse every $N^{th}$ period of CLK signal, and the EN output signal (Block 104), which has a pulse every $M \times N^{th}$ period of the CLK signal (where M and N are both positive integers). The processor 102 reads input signals or changes output signals at arbitrary moments between EN pulses. But flip-flops 106 and 108 connected to processor input and output signals change values only at the rising (or falling) edge of EN pulses. As a result, the processor 102 reads input signal levels actually sampled from Input Shifter 202 at the EN pulse edge just before reading. Also, output signal updates from the processor actually translate to the Output Shifter 204 at the nearest EN pulse edge.

To avoid unnecessary clutter in the drawing, flip-flop 106 of FIG. 2A is depicted as a single flip flop. In this embodiment of the invention, one or more flip-flops are capable of being so employed in parallel to enable processing of multiple bits being transferred in parallel. Similarly, depicted flip-flop 108 of FIG. 2A represents one or more output flip-flops.

As discussed above with respect to FIG. 1A, it is well known in the art that typically the processor senses the active edge of EN pulses, and runs firmware code when activated by such edge. Consequently, at such activation this firmware code reads input signals, makes required computations, and updates output signals. This embodiment of the invention enables the system to perform those operations using precisely timed data from Input Shifter 202 or Output Shifter 204.

The actual moments of signal reads and updates by the processor are not significant as long as they fit between adjacent active edges of EN pulses. This property allows regular programming style with just overall processing time being limited by the EN pulses period. Consequently, detailed adjustment of actual time of signal reads and writes is not required. This also allows for the fact that the described processing computation between active edges of EN pulses could be conditional and could take different and data-dependent time. As long as the maximum possible computation time is smaller than the period of the EN pulses, the timing of data exchange with shifters is unchanged. As a result, adjusting signal timing is dramatically simplified.

As further depicted in the timing diagram of FIG. 2B, the SHFT signal has M pulses between two adjacent active edges of EN pulses. At every pulse of the SHFT signal, the rising (or falling) edge shifts the contents of the Output Shifter 204 by one bit, causing the output signal to be updated every SHFT pulse. Since the shifter has M bits, these bits would determine the output signal for the duration of M pulses of the SHFT signal, which corresponds to the period between two adjacent active edges of EN pulses. At every active edge of the EN pulse, the contents (all M bits) of flip-flops 108, acting as an Output Data Register, are copied into the Output Shifter 204. Typically in such a system the processor updates the Output Data Register 108 connected to the Output Shifter 204 at the same rate (every EN pulse). Thus with this embodiment of the invention, any arbitrary output signal waveform could be generated completely by processor firmware running at an activation rate, which is M times lower than the signal update rate.

On the input side, the rising (or falling) edge of every SHFT pulse shifts the new input signal level sample into the Input Shifter 202. In this embodiment Input Shifter 202 is a hardware-based, serial-in, parallel-out shift register. The input signal is sampled M times during each firmware activation period, and all these samples are shifted into Input Shifter 202. That is, M bits of the Input Shifter 202 are filled after M pulses of the SHFT signal, which corresponds to the period between two adjacent active edges of EN pulses. At every active edge of the EN pulse, the content of the Input Shifter 202 (all M successive samples of the input signal) is stored into flip-flops 106, which acts as an Input Data Register. Typically in such a system the processor 102 reads the Input Data Register before the next active edge of EN pulse. Thus, processor firmware can read an input signal with a sampling rate that is M times higher than processor firmware activation rate.

While the invention has been described with reference to the above described embodiments thereof, it will be appreciated by those of ordinary skill in the art that modifications can be made to the structure and elements of the invention without departing from the spirit and scope of the invention as a whole.

What is claimed is:

1. In a data transfer device comprising a processor at least partly controlled by firmware instructions, a method for synchronizing input operations; said method comprising the stops of:

generating an enable signal (EN);

generating a SHFT signal, wherein the SHFT signal is generated at the $N^{th}$ occurrence of a hardware clock signal (CLK) and the EN signal is generated at the $MxN^{th}$ occurrence of the CLK signal where M and N are both positive integers;

establishing an input signal path to the processor through an input data register;

supplying an input shifter as an input to said input data register, wherein the input shifter shifts one bit of data at an occurrence of the SHFT signal;

causing the input data register to change values only at an occurrence of the EN signal; and, activating the firmware instructions to access the input data register only at an occurrence of the EN signal.

2. The method of claim 1 wherein the EN signal is generated at the $N^{th}$ occurrence of a hardware clock signal (CLK) where N is a positive integer.

3. The method of claim 1 further comprising a method for synchronizing output operations comprising:

establishing an output signal pat from the processor through an output data register;

causing the output data register to change values only at an occurrence of the EN signal; and, activating the firmware instructions to perform a data output operation only at an occurrence of the EN signal.

4. In a data transfer device comprising a processor at least partly controlled by firmware instructions, a method for synchronizing output operations; said method comprising the steps of:

generating an enable signal (EN);

generating a SHFT signal, wherein the SHFT signal is generated at the $N^{th}$ occurrence of a hardware clock signal (CLK) and the EN signal is generated at the $MxN^{th}$ occurrence of the CLK signal where M and N are both positive integers;

establishing an output signal path from the processor through an output data register;

functionally connecting the output of said output data register to an output shifter, wherein the output shifter shifts one bit of data at an occurrence of the SHFT signal;

causing the output data register to change values only at an occurrence of the EN signal; and, activating the firmware instructions to perform a data output operation only at an occurrence of the EN signal.

5. The method of claim 4 wherein the EN signal is generated at the $N^{th}$ occurrence of a hardware clock signal (CLK) where N is a positive integer.

6. The method of claim 4 further comprising a method for synchronizing input operations comprising:

establishing an input signal path to the processor through an input data register;

causing the input data register to change values only at an occurrence of the EN signal; and, activating the firmware instructions to access the input data register only at an occurrence of the EN signal.

7. A data transfer device for synchronizing input operations, said device having a processor at least partly controlled by firmware instructions, said device comprising:

an input terminal adapted for receiving an input signal;

a data exchange pattern generator for generating an enable signal (EN);

a signal update pattern generator for generating a SHFT signal, wherein the SHFT signal is generated at the $N^{th}$ occurrence of a hardware clock signal (CLK) and the EN signal is generated at the $MxN^{th}$ occurrence of the CLK signal, where M and N are both positive integers;

an input data register functionally connected to the input terminal, said input data register coupled to the processor;

an input shifter functionally connected between said input terminal and said input data register, wherein the input shifter shifts one bit of data at an occurrence of the SHFT signal;

wherein said input data register changes values only at an occurrence of the EN signal; and, wherein firmware instructions to access the input data register are activated only at an occurrence of the EN signal.

8. The device of claim 7 wherein the EN signal is generated at the $N^{th}$ occurrence of a hardware clock signal (CLK) where N is a positive integer.

9. The device of claim 7 further comprising a means for synchronizing output operations comprising:

an output data register adapted for performing a data output operation, said output data register coupled to the processor;

wherein said output data register changes values only at an occurrence of the EN signal; and, wherein firmware instructions perform a data output operation using the output data register only upon an occurrence of the EN signal.

10. A data transfer device for synchronizing output operations, said device having a processor at least partly controlled by firmware instructions, said device comprising:

a data exchange pattern generator for generating an enable signal (EN);

a signal update pattern generator for generating a SHFT signal, wherein the SHFT signal is generated at the $N^{th}$ occurrence of a hardware clock signal (CLK) and the EN signal is generated at the $MxN^{th}$ occurrence of the CLK signal where M and N are both positive integers;

an output data register adapted for performing a data output operation, said output data register coupled to the processor;

an output shifter functionally connected to said output data register, wherein the output shifter shifts one bit of data at an occurrence of the SHFT signal;

wherein said output data register changes values only at an occurrence of the EN signal; and, wherein firmware instructions perform a data output operation using the output data register only upon an occurrence of the EN signal.

11. The device of claim 10 wherein the EN signal is generated at the $N^{th}$ occurrence of a hardware clock signal (CLK) where N is a positive integer.

12. The device of claim 10 further comprising a means for synchronizing input operations comprising:

an input terminal adapted for receiving an input signal;

an input data register functionally connected to the input terminal, said input data register coupled to the processor;

wherein said input data register changes values only at an occurrence of the EN signal; and, wherein firmware instructions to access the input data register are activated only at an occurrence of the EN signal.

* * * * *